No. 701,530.  
J. L. ALGER.  
LOCK NUT.  
(Application filed Mar. 5, 1902.)  
Patented June 3, 1902.

(No Model.)

Witnesses:  
Wm. H. Varnum.  
C. S. Miller.

Inventor:  
John L. Alger  
By Henry J. Miller  
atty.

UNITED STATES PATENT OFFICE.

JOHN L. ALGER, OF MEDFORD, MASSACHUSETTS.

LOCK-NUT.

SPECIFICATION forming part of Letters Patent No. 701,530, dated June 3, 1902.

Application filed March 5, 1902. Serial No. 96,772. (No model.)

*To all whom it may concern:*

Be it known that I, JOHN L. ALGER, a citizen of the United States, residing at Medford, in the county of Middlesex and State of Massachusetts, have invented a certain new and useful Improvement in Lock-Nuts, of which the following is a specification, reference being had therein to the accompanying drawings.

This invention relates to improvements in lock-nuts, wherein locking means are provided for locking the nuts in position against accidental release or retraction.

The main object of the invention is to so construct a two-part nut that the parts thereof may be securely locked together, either on the run of the screw-thread with which they are engaged or with one of said parts bearing against some portion or part which it is intended to secure against movement.

Another object of the invention is to simplify the construction of nut-locks and to increase their efficiency.

The invention consists particularly in the peculiar construction of the locking member and in the diagonal slot therein.

The invention also consists in such other novel features of construction and combination of parts, as shall hereinafter be more fully described, and pointed out in the claims.

Figure 1:
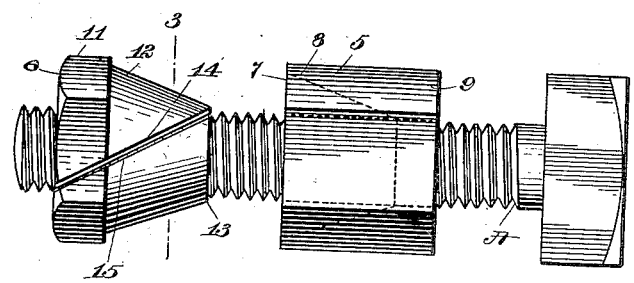
Figure 2:
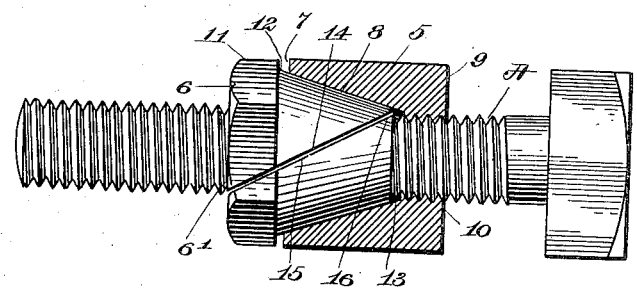
Figure 3:
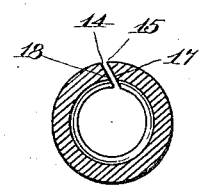

Figure 1 represents in side elevation the two parts or members of the improved nut mounted on a bolt and separated from each other. Fig. 2 represents a similar view, partially in section, of the nut with its two members in engagement or in the locked position. Fig. 3 represents a cross-sectional view of the locking member, taken on line 3 3, Fig. 1.

Similar characters of reference designate corresponding parts throughout.

In the drawings, A represents a screw-threaded bolt or rod on which the lock-nut is designed to be screwed. The lock-nut comprises two members 5 and 6, which when combined form a thrust-resisting device or a clamping mechanism, depending on the nature of the device to be secured thereby. The member 5 has an exterior designed to be engaged by a wrench or other tool, whereby the member may be screwed into place. In the end 7 of this member 5 is formed a conical socket 8, proportioned to the size and shape of the member, and between the contracted end of this socket and the face 9 of the nut is a screw-threaded bore 10, adapted to be screwed onto any suitable bolt or rod.

The member 6 comprises a base 11, adapted to be engaged by a tool for screwing the member in place, and a conical extension 12, having the end 13, both the base and its extension being supplied with a screw-threaded bore of a diameter and pitch corresponding to that of the member 5. Through the base 11 and the conical extension 12 is cut a slot 14, extending diagonally to the bore therein and preferably in a direction generally opposite to the extension of the screw-thread of said bore, this slot 14 being also slanted from the median plane of the member, as is shown in Fig. 3, to provide the edge 15, which joins the end 13 at a retracted angle to form the tooth 16 and the surfaces 17 and 18. This slot is preferably of such width that it can be practically closed when the member 6 is compressed onto its bolt.

When the nut is to be utilized, the member 5 is screwed onto a bolt or rod and brought to position. The member 6 is then screwed onto the bolt or rod until its conical extension 12 enters the conical socket 8 of the member 5. This member 5 is then held with one wrench or tool, while the member 6 is screwed up tightly with another wrench or tool. The primary action of the conical face of the socket 8 on the cone 12 being to compress said cone to effect a close embrace of the bolt or bar by the bore of the cone and its base by the closing of the slot 14 therein, the effect of further rotative action on this member 6 being then to force the inclined surface 18 against the inclined surface 17, causing the sufficient spreading or lifting of the surface 17 to effect a biting action of the edge 15, and particularly at the tooth 16, into the wall of the conical socket 8. At the same time the cam action of the inclined and slanting face 18 against the similar face 17 tends to exert a torsional strain thereon, the reaction of which on the face 18 exerts a slight distortion of the part 6' of the base and a slight canting effect of this portion of the member 6, as is shown in Fig. 2 of the drawings, by the portion 6' being slightly offset from the main line of the base, whereby additional resistance to intermittent retractive strains is secured. It will be understood that the biting effect of the edge 15 into the wall of the socket 8 is very slight and such that it will not materially resist the turning back of the member 6 by a suitable tool, while it is sufficient to prevent the accidental retractive rotation of the member 6.

It is evident that the slot 14 may vary considerably in shape and size from that shown and that its angle of extension and the general direction of the same may be considerably changed without departing from the spirit of this invention.

Having thus described my invention, I claim as new and desire to secure by Letters Patent—

1. A lock-nut member comprising a base and a conical extension having a bore and slotted from end to end, said slot extending in a direction diagonal to the bore.

2. A lock-nut member comprising a base and a conical extension having a screw-threaded bore and having a diagonal slot extending from end to end and in a direction generally opposite to the extension of the screw-thread.

3. A lock-nut member comprising a base and a conical extension having a bore and slotted from end to end, said slot being inclined to the median plane of the member, whereby a biting edge and an expanding wedge are formed on the respective faces of said slot.

4. A lock-nut comprising a base and a conical extension having a bore and furnished with a slot diagonal to bore and inclined to the median plane thereof.

5. The combination with the member 5 having the conical socket 8, of the member 6, having the base 11 and the extension 12 and furnished with the slot 14, having the edge 15 and the surfaces 17 and 18, as and for the purpose described.

In testimony whereof I affix my signature in presence of two witnesses.

JOHN L. ALGER.

Witnesses:
JOHN P. ALGER,
ARTHUR E. DENISON.